United States Patent [19]

Jacquet

[11] Patent Number: 4,498,528

[45] Date of Patent: Feb. 12, 1985

[54] MEANS FOR HOLDING A FLAP WHICH IS ROTATABLY MOUNTED IN A CONDUIT, AND HOUSING CONTAINING SAID MEANS, FOR A VEHICLE AIR CONDITIONING INSTALLATION

[75] Inventor: Maurice Jacquet, Maurepas, France

[73] Assignee: Valeo, Paris, France

[21] Appl. No.: 470,399

[22] Filed: Feb. 28, 1983

[30] Foreign Application Priority Data

Mar. 8, 1982 [FR] France .................. 82 03863

[51] Int. Cl.³ .............................. F28D 15/00
[52] U.S. Cl. ...................... 165/42; 98/2.06; 251/306; 137/625.44
[58] Field of Search .......... 251/306, 358, 359; 137/625.44, 875; 165/105; 98/2.06

[56] References Cited

U.S. PATENT DOCUMENTS

| | | | |
|---|---|---|---|
| 2,338,332 | 8/1943 | Filkins | 98/85 |
| 3,502,299 | 3/1970 | Phillips | 251/306 |
| 4,154,426 | 5/1979 | Santy et al. | 251/306 X |
| 4,216,822 | 8/1980 | Izumi | 165/42 |

FOREIGN PATENT DOCUMENTS

| | | |
|---|---|---|
| 2402731 | 1/1973 | Fed. Rep. of Germany . |
| 2504475 | 3/1976 | Fed. Rep. of Germany . |
| 2484337 | 3/1980 | France . |
| 2462659 | 7/1981 | France . |
| 6325 | 3/1913 | United Kingdom . |

Primary Examiner—William E. Wayner
Attorney, Agent, or Firm—Dennison, Meserole, Pollack & Scheiner

[57] ABSTRACT

In an installation for heating, ventilating or air conditioning the cabin of a motor vehicle, a conduit (10) has a wall (20) over which the edge of a flap (15) passes during travel of the flap to control the flow of air in the conduit. The wall has a rib or thickening (25) which engages the edge of the flap by friction to prevent the flap from moving away from a position to which it has been set.

5 Claims, 3 Drawing Figures

MEANS FOR HOLDING A FLAP WHICH IS ROTATABLY MOUNTED IN A CONDUIT, AND HOUSING CONTAINING SAID MEANS, FOR A VEHICLE AIR CONDITIONING INSTALLATION

The present invention relates to means for holding a flap or the like which is rotatably mounted about an axis in a chamber or a conduit through which a fluid such as air is flowing.

BACKGROUND OF THE INVENTION

Such flaps are used in installations for heating and ventilating or air conditioning the cabins of motor vehicles. The flap can be moved between two extreme positions, eg. by means of a cable guided along a sheath and by a control lever which is movable across the vehicle dash board.

The force that needs to be applied to the control lever and hence to the cable in order to move the lever and the flap must always be greater than the sum of the other forces acting on the flap. Said other forces include interference forces due to vibration and the weight of the flap, pressure forces due to the flow of air near the flap, the force required to hold the flap in the position set by the lever on the dash board, and friction forces between the cable and its sheath.

The force that needs to be applied to move the control lever is therefore quite substantial, and it is desirable at present to reduce this force so that the control becomes easier and more agreeable to operate and also more accurate.

It has also been observed that, under certain conditions, the interference forces on the flap can exceed the forces holding the flap in the position set by the control lever, in which case the flap moves to a position which corresponds to conditions of heating, ventilating, or air conditioning in the vehicle cabin other than that selected by the user.

Preferred embodiments of the invention avoid this drawback by flap-retaining means which are simple, effective, and very cheap, and which do not go against vehicle manufacturers' requirements for a control lever which is easy to move.

SUMMARY OF THE INVENTION

The present invention provides means for holding a flap rotatably mounted in a conduit having a fluid such as air flowing therealong, in particular in an installation for heating, ventilating or air conditioning the cabin of a motor vehicle, wherein the conduit has a wall over which an edge of the flap moves when the flap rotates, and said wall has a rib or thickening suitable for co-operating by means of friction with said edge of the flap.

The friction force between the edge of the flap and the rib or thickening in the wall of the conduit adds to the forces opposing movement of the flap due to the above-mentioned interference forces. This thus enables the flap to be held in a determined position regardless of the extent of such forces under any conditions of vehicle movement.

Preferably, the edge of the flap is provided with a resiliently deformable sealing fitting and it is the sealing fitting which co-operates by means of friction and resilient deformation with said rib or thickening.

The resilient deformation of the fitting as the edge of the flap rubs against the rib or thickening serves to hold the flap in position without excessively increasing the force which must be applied to the control lever to move the flap.

Advantageously, said rib or thickening co-operates only with a portion of said edge of the flap, said portion being distant from the axis about which said flap is rotatably mounted.

This increases the effectiveness of the rib and also the accuracy with which the flap position can be controlled.

It is also advantageous for said rib or thickening to extend only over a portion of the travel of the edge of the flap with which it co-operates.

This is because it has been observed that the flap is subjected to strong interfering forces only over a portion of its travel, so it is pointless for the rib or thickening in the conduit wall to extend over the entire travel of the edge of the flap with which it co-operates.

The rib or thickening can be part of the same moulding as the rest of the conduit wall, so the extra cost it entails is substantially nul.

The invention also provides a housing of an installation for heating, ventilating, or air conditioning the cabin of a motor vehicle, said housing having a conduit through which air flows and in which an air flow controlling flap is rotatably mounted, wherein said housing includes means as defined above for holding said flap in position.

BRIEF DESCRIPTION OF THE DRAWINGS

An embodiment of the invention is described by way of example with reference to the accompanying drawing, in which.

MORE DETAILED DESCRIPTION

Figure 1:
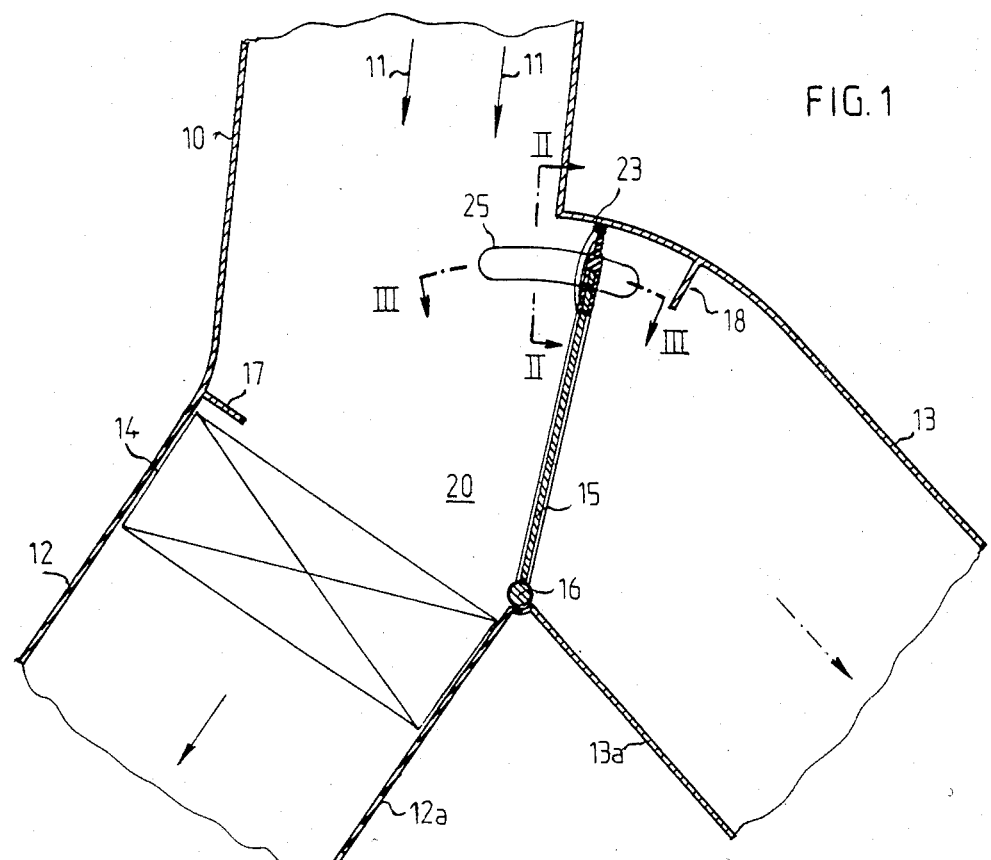
FIG. 1 is a diagrammatic section through a housing in accordance with the invention.

The portion of a housing shown diagrammatically in section in FIG. 1 comprises a conduit 10 along which air flows in the direction of arrows 11. The conduit 10 forks into two branches or conduits 12 and 13, with the branch 12 containing a heat exchanger 14 through which air flowing along the conduit 12 has to pass, while the other branch 13 is free. A flap 15 is pivotally mounted about a transverse axis in the region where the conduit 10 forks into the branches 12 and 13. The flap is movable between first and second limit positions determined by a first stop 17 at the upstream end of the branch 12 and a second stop 18 at the upstream end of the branch 13. When the flap 15 is against the first stop 17 it closes off the branch 12 and all the air flowing along the conduit 10 is directed into the branch 13. Conversely, when the flap 15 is against the second stop 18, it closes off the branch 13 and all the air flowing along the conduit 10 is directed into the branch 12, where it passes through the heat exchanger 14. When the flap 15 is in an intermediate position in between said limit positions, a portion of the air flowing along the conduit 10 is directed to the branch 12 and therefore through the heat exchanger 14, while the remainder is directed into the branch 13.

In this embodiment, the axis 16 is located substantially at the line where the walls 12a and 13a of the branches 12 and 13 meet, with the flap 15 extending upstream towards the conduit 10. The flap 15 is substantially rectangular in shape and has one of its long sides hinged about the axis 16. The short sides perpendicular to the axis 16 co-operate in sealed manner with two plane parallel walls constituting the conduit 10 just upstream from where they become the walls of the branches 12 and 13. To improve sealing, the sides of the flap 15 are provided with a resiliently deformable sealing fitting 21 which is advantageously moulded onto the periphery of the flap, (see FIGS. 2 and 3). The fitting 21 has a thin lip portion 22 terminated by a cylindrical bead or rounded rim 23.

One of the plane walls 20 of the conduit 10 extending perpendicularly to the axis 16 has a rib or thickening 25 which projects a small way into the conduit 10 in the region over which the flap 15 moves when going from one limit position to the other. The rib 25, which may for example be shaped in an arc about the axis 16, is advantageously shorter than the total travel of the corresponding portion of the flap, in which case the rib extends only over a region where the flap is subjected to maximum interference forces.

It has been observed in the embodiment shown in FIG. 1, that such a region extends close to the limit position in which the flap 15 is against the second stop 18 and closes the branch 13 which does not have the heat exchanger 14. When the flap is in the intermediate position shown in FIG. 1, in which most of the air flowing along the conduit 10 passes through the heat exchanger 14 in the branch 12, a localised region of excess pressure builds up in front of the heat exchanger 14 and tends to thrust the flap 15 back against the second stop 18. This thrust force may be greater than the force required to move the flap together with its control cable and the control lever.

Figure 2:
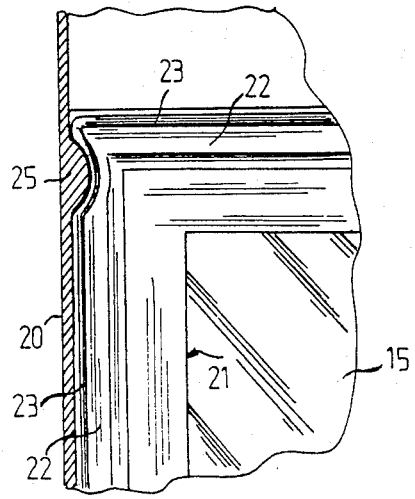
FIG. 2 is a diagrammatic section along a line II—II in FIG. 1.
Figure 3:
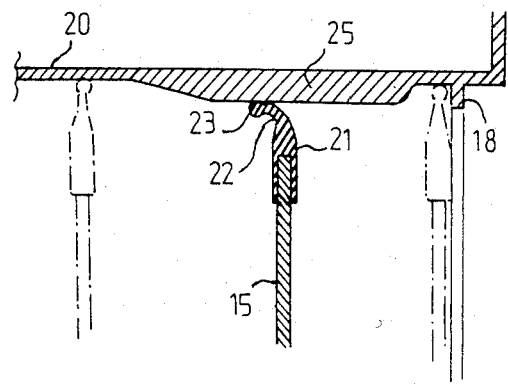
FIG. 3 is a diagrammatic section along a line III—III in FIG. 1.

The portion of the short side of the flap 15 which engages the rib 25 is near to the long side of the flap 15 opposite to the axis 16. This opposite end portion of the flap is essentially constituted by the sealing fitting 21 as moulded over the periphery of the flap, and it is therefore easily deformed. When the sealing fitting is moved over the rib or thickening 25, it deforms as shown in FIGS. 2 and 3, and the resulting extra friction between the sealing fitting 21 and the rib or thickening 25 is sufficient to hold the flap in position against the parasitic forces acting thereon.

The fitting 21 is sufficiently flexible to maintain sealing, even when it is over the rib 25.

In order to avoid rapid wear of the fitting 21, the edges of the rib or thickening 25 are rounded, and its ends slope gently into the wall 20 along surfaces which curve smoothly.

The rib 25 is integrally moulded with the rest of the wall 20 of the conduit 10, and thus constitutes a kind of local deformation of the wall.

I claim:

1. Means for holding a flap rotatably mounted in a conduit having a fluid such as air flowing therealong, in particular in an installation for heating, ventilating or air conditioning the cabin of a motor vehicle, wherein the conduit has a wall over which an edge of the flap moves when the flap rotates, and said wall has a rib or thickening suitable for cooperating by means of friction with said edge of the flap, said rib or thickening extending only over a portion of the travel of the edge of the flap with which it cooperates, said conduit forking into first and second branches, with the first branch containing a heat exchanger and the second branch being free, and with the flap being mounted to rotate between a first limit position in which it closes the first branch and a second limit position in which it closes the second branch, said rib or thickening extending only over a portion of the travel of the flap relatively close to said second limit position.

2. Means for holding a flap rotatably mounted in a conduit having a fluid such as air flowing therealong, in particular in an installation for heating, ventilating or air conditioning the cabin of a motor vehicle, said conduit having at least one branch downstream of said flap, a limit position, said flap being mounted for selective rotational travel to the limit position, and said branch being closed by said flap when the flap is in the limit position, wherein said conduit has a wall over which an edge of the flap moves when the flap rotates, and said wall has a rib adapted for cooperating by friction with the edge of the flap, said rib extending over a portion of the travel of the edge of the flap spaced away from said limit position for holding said flap in positions other than said limit position.

3. Means according to claim 2, wherein the edge of the flap is provided with a resiliently deformable sealing fitting for cooperation by means of friction and resilient deformation with said rib.

4. Means according to claim 3, wherein the sealing fitting is moulded over the edge of the flap and comprises a thin lip terminated by a cylindrical bead or rounded rim.

5. Means according to claim 4, wherein the edges of the rib are sloped.

* * * * *